(12) United States Patent
Shaffer et al.

(10) Patent No.: US 11,757,295 B2
(45) Date of Patent: Sep. 12, 2023

(54) MARINE BATTERY CHARGER CABLE EXPENDER

(71) Applicant: Brunswick Corporation, Mettawa, IL (US)

(72) Inventors: Benjamin C. Shaffer, Bedford, NH (US); Gerald J. Demirjian, Auburn, NH (US); Brian R. D'Amelio, Auburn, NH (US)

(73) Assignee: Brunswick Corporation, Mettawa, IL (US)

( * ) Notice: Subject to any disclaimer, the term of this patent is extended or adjusted under 35 U.S.C. 154(b) by 359 days.

(21) Appl. No.: 16/913,095

(22) Filed: Jun. 26, 2020

(65) Prior Publication Data
US 2021/0408811 A1 Dec. 30, 2021

(51) Int. Cl.
*H02J 7/00* (2006.01)
*H01M 10/46* (2006.01)
(Continued)

(52) U.S. Cl.
CPC .......... *H02J 7/0042* (2013.01); *H01M 10/46* (2013.01); *H01R 11/26* (2013.01); *H02G 11/00* (2013.01);
(Continued)

(58) Field of Classification Search
CPC .................................................. H02J 7/0042
(Continued)

(56) References Cited

U.S. PATENT DOCUMENTS

| 8,234,760 | B2* | 8/2012 | Vogelsang | ........... A44B 19/262 24/429 |
| 2002/0100652 | A1* | 8/2002 | Loyd | ..................... H02J 7/0042 191/12.4 |

(Continued)

FOREIGN PATENT DOCUMENTS

KR        200430965 Y1    11/2006

OTHER PUBLICATIONS

European search report dated Nov. 21, 2021 in counterpart European Patent Application 21181752.3.
(Continued)

*Primary Examiner* — Yalkew Fantu
(74) *Attorney, Agent, or Firm* — ANDRUS INTELLECTUAL PROPERTY LAW, LLP

(57) ABSTRACT

A marine battery charger cable extender includes a terminal end that has a positive extender ring terminal and a negative extender ring terminal, and a connection end configured to connect to a terminal end of a pre-wired battery charger. The connection end includes a positive ring end, a positive ring connector configured to hold the positive ring end and galvanic connection with a positive ring terminal of the pre-wired battery charger, and a positive connection cover configured to completely encapsulate the connected positive ring end of the cable extender and the positive ring terminal of the pre-wired battery charger. The connection end also includes a negative ring end, a negative ring connector configured to hold the negative ring end in galvanic connection with a negative ring terminal of the pre-wired battery charger, and a negative connection cover configured to completely encapsulate the connected negative ring end of the cable extender and the negative ring terminal of the pre-wired battery charger.

20 Claims, 5 Drawing Sheets

(51) Int. Cl.
    *H01R 11/26*    (2006.01)
    *H02G 11/00*    (2006.01)
(52) U.S. Cl.
    CPC ....... *H02J 7/00047* (2020.01); *H02J 2310/42* (2020.01)
(58) Field of Classification Search
    USPC ......................................................... 320/107
    See application file for complete search history.

(56) References Cited

U.S. PATENT DOCUMENTS

| | | |
|---|---|---|
| 2003/0178949 A1 | 9/2003 | Hasegawa et al. |
| 2005/0070155 A1* | 3/2005 | Horenstein ............ H01R 24/84 439/522 |
| 2005/0186814 A1 | 8/2005 | Vogel et al. |
| 2015/0295340 A1* | 10/2015 | Boudreaux .......... H01R 11/288 439/488 |
| 2018/0186036 A1 | 7/2018 | Hirooka et al. |
| 2019/0168694 A1 | 6/2019 | Kato |

OTHER PUBLICATIONS

ProMariner. "Promariner 51070 Promariner 15' Battery Bank". Accessed from https://www.walmart.com/ip/Promariner-51070-Promariner-15-Battery-Bank/20934565 on Feb. 28, 2020.
ProMariner. "Pro Mariner 15-Feet Battery Bank Cable Extender—51070". Accessed from https://www.amazon.com/Mariner-15-Feet-Battery-Cable-Extender/dp/B000KOR766 on Feb. 28, 2020.

* cited by examiner

MARINE BATTERY CHARGER CABLE EXPENDER

FIELD

The present application is generally directed to marine battery charger systems, and more particularly to a cable extender for a pre-wired marine battery charger installed on a marine vessel.

BACKGROUND

Marine vessels have electrical systems powered by one or more batteries storing electrical power on the marine vessel. The batteries require charging and an on-board marine battery charging system are the safest and most convenient way to charge and maintain those batteries.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A marine battery charger cable extender includes a terminal end that has a positive extender ring terminal and a negative extender ring terminal, and a connection end configured to connect to a terminal end of a pre-wired battery charger. The connection end includes a positive ring end, a positive ring connector configured to hold the positive ring end in galvanic connection with a positive ring terminal of the pre-wired battery charger, and a positive connection cover configured to completely encapsulate the connected positive ring end of the cable extender and the positive ring terminal of the pre-wired battery charger. The connection end also includes a negative ring end, a negative ring connector configured to hold the negative ring end in galvanic connection with a negative ring terminal of the pre-wired battery charger, and a negative connection cover configured to completely encapsulate the connected negative ring end of the cable extender and the negative ring terminal of the pre-wired battery charger.

Another embodiment of a marine battery charger cable extender includes a terminal end having a positive extender ring terminal configured to connect to a positive battery terminal and a negative extender ring terminal configured to connect to a negative battery terminal, and a connection end configured to connect to a terminal end of a pre-wired battery charger. The connection end includes a positive ring end, a positive ring connector including a first metal screw configured to hold the positive ring end in galvanic connection with a positive ring terminal of the pre-wired battery charger, and a positive connection cover configured to completely encapsulate the connected positive ring end of the cable extender and the positive ring terminal of the pre-wired battery charger. The connection end further includes a negative ring end, a negative ring connecter including a second metal screw configured to hold the negative ring end in galvanic connection with a negative ring terminal of the pre-wired battery charger, and a negative connection cover configured to completely encapsulate the connected negative ring end of the cable extender and the negative ring terminal of the pre-wired battery charger. Each of the positive connection cover and the negative connection cover are formed by a first cover piece and a second cover piece releasably connected together.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Marine battery chargers come pre-wired because the connection between the battery charger and the cable wire must be sealed into the body of the charger in a waterproof way so that water cannot penetrate and reach the electrical connection. Available pre-wired battery chargers come with a standard six foot cable. The present inventors have recognized that pre-wired battery chargers to be installed onboard marine vessels often need to be installed some distance away from the batteries they are charging, which is sometimes more than six feet and thus the cable wires of the pre-wired battery charger to do not reach one or more of the batteries that they are meant to charge. The inventors have recognized that, in order to accommodate the additional distance, people often extend the cable wires of the pre-wired battery chargers in unsafe ways. For example, people may cut the fuses off and solder extension wires directly to the cables on the charger. This can be a fire hazard and does not meet minimum boating safety standards.

Based on recognition of the foregoing problems and challenges in the relevant field, the inventors developed a reliable marine battery charger cable extender that enables extension of a pre-wired battery charger to additional lengths without requiring cutting off the ring terminal. Prior art extenders do exist but have not offered easy and reliable means for connecting the cable extender to the terminal ends of the pre-wired battery charger in a way that sufficiently protects and maintains the connection and can withstand the wet and harsh conditions on a marine vessel. For example, prior cable extenders do not provide sufficiently tight connections between the ring terminals of the pre-wired charger and the terminals of the cable extender. Additionally, prior art systems do not sufficiently protect that connection from short circuit caused by conductive elements such as fish hooks or loose tools. Moreover, the inventors have recognized that problems exist with current cable extenders and that the connections between the ring terminals loosen over time.

In view of the foregoing problems and challenges in the relevant art, the inventors developed the disclosed system and method that, in certain embodiments, provides a metal ring connector to connect the ring terminal of the pre-wired marine charger to the ring connectors of the cable extender so as to provide a tight and durable connection that can withstand vibrations in the harsh marine environment. Additionally, the disclosed cable extender includes a connection cover over each of the positive and negative ring connections, where the connection cover is configured to completely encapsulate the ring connections between the cable extender and the terminal end of the pre-wired battery charger. Furthermore, the connection is removable for purposes of maintenance and the entire system is reusable.

Figure 1:
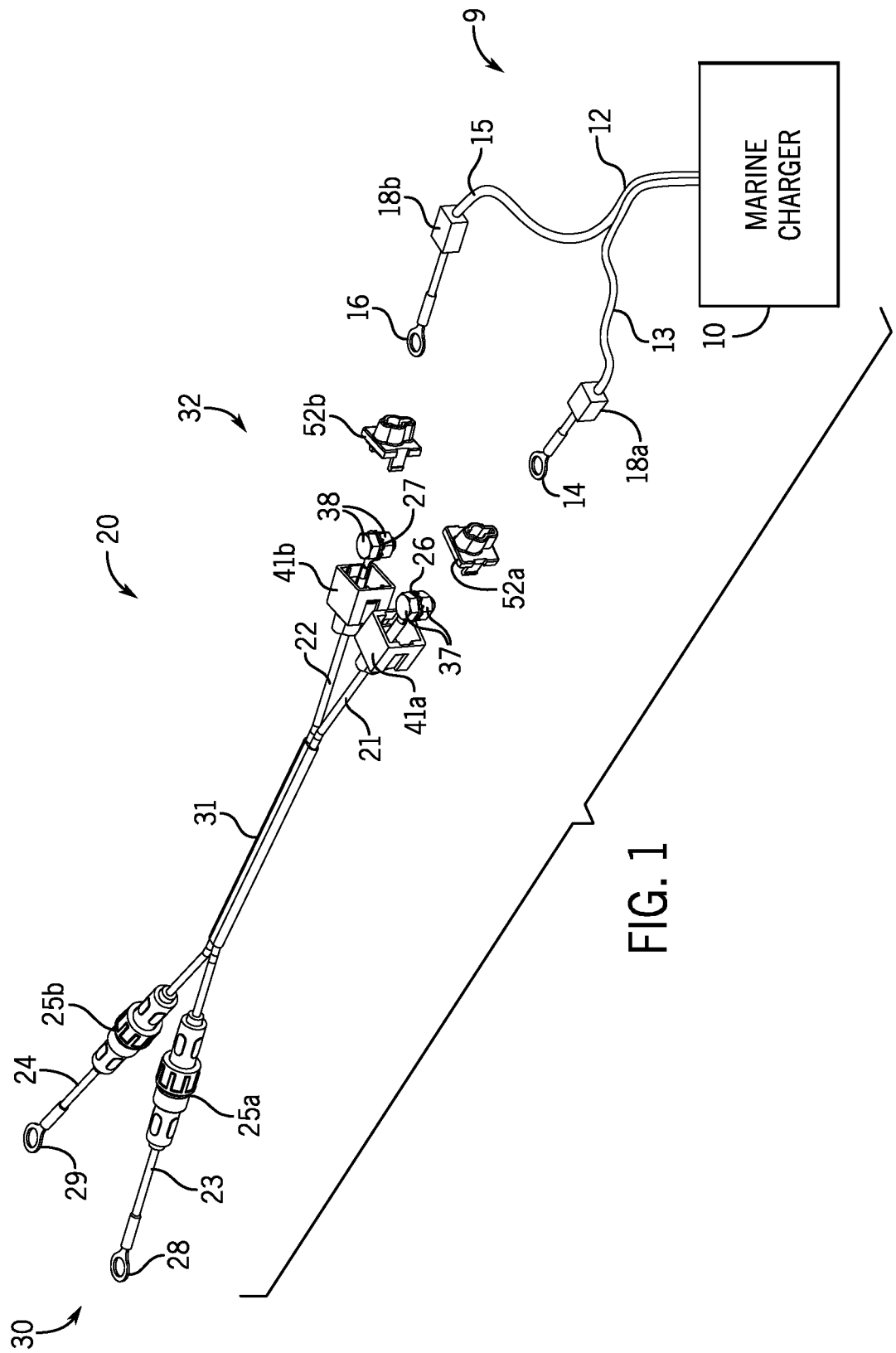
FIG. 1 depicts a pre-wired marine battery charger and a cable extender therefore according to one embodiment of the present disclosure.

FIG. 1 depicts one embodiment of a cable extender 20 for a pre-wired marine battery charger 9. The pre-wired marine battery charger 9 includes a battery charger 10 connected by a waterproof seal to a cable 12, which is a standard six foot cable. The cable 12 includes a negative cable wire 13 that terminates at a negative ring terminal 14, and a positive cable wire 15 that terminates at a positive ring terminal 16. Each of the positive and negative cable wires 13, 15 includes a fuse 18a, 18b, as is standard on marine battery chargers.

The cable extender 20 has a connection end 32 that connects to the ring terminals 14, 16 of the pre-wired battery charger 9, and a terminal end 30 that includes a negative extender ring terminal 28 and a positive extender ring terminal 29 that are configured to connect to the positive and negative terminals of a battery installed on the marine vessel. The cable extender 20 includes a negative extender wire 21 and a positive extender wire 22 that extend from the connection end 32 to a respective fuse 25a, 25b. A terminal end 23 of the negative extender wire 23 connects between the fuse 25a and the negative extender ring terminal 28. A terminal end 24 of the positive extender wire connects between the fuse 25b and the positive extender ring terminal 29.

Figure 2:
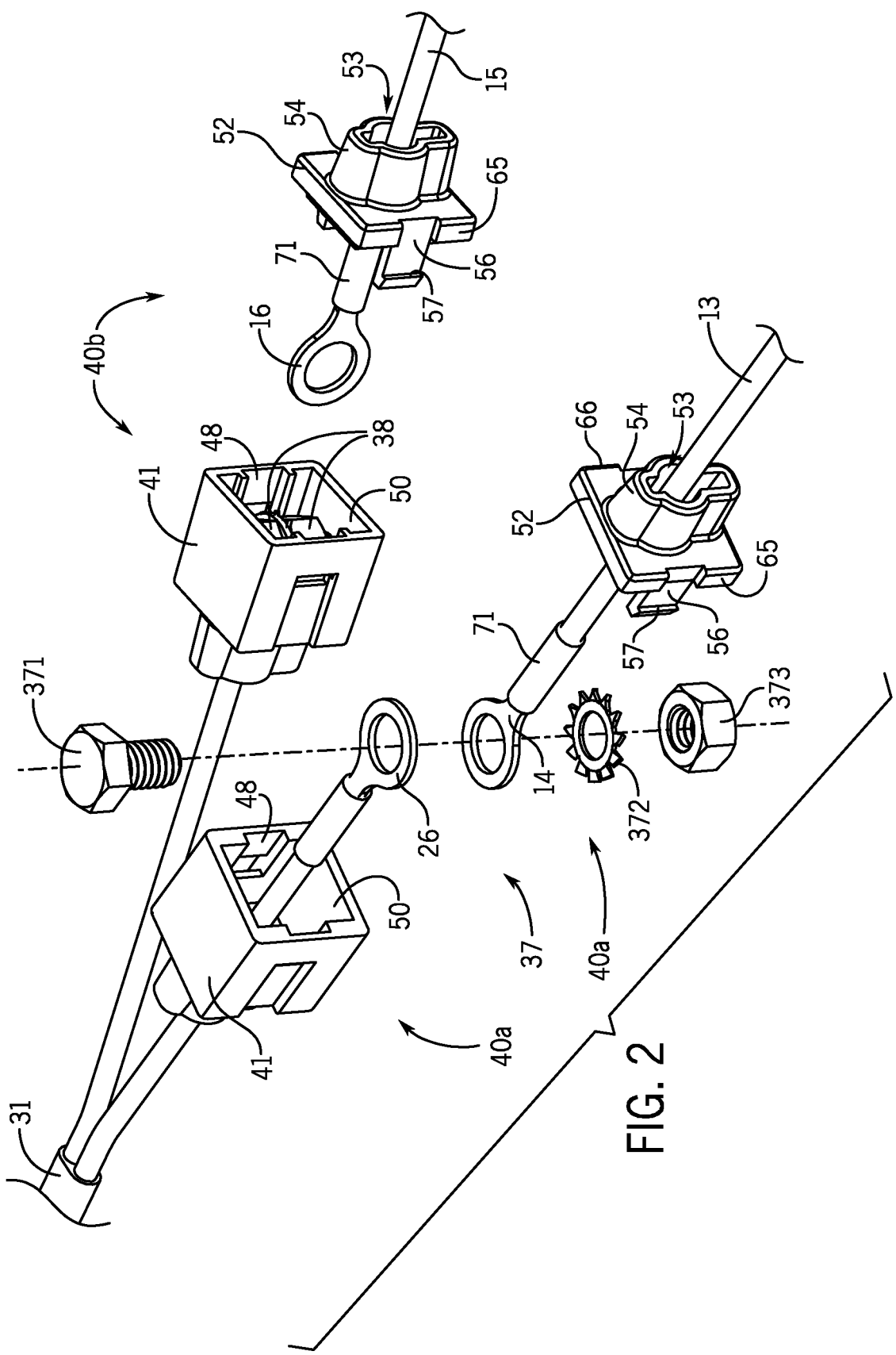
FIG. 2 depicts connection of one embodiment of a cable extender to a terminal end of a pre-wired marine battery charger.

Referring also to FIG. 2, a negative ring connector 37 is configured to hold the negative ring end 26 of the cable extender 20 to the negative ring terminal 14 of the pre-wired battery charger 9. Similarly, a positive ring connector 38 is configured to hold the positive ring end 27 of the cable extender 20 to the positive ring terminal 16 of the pre-wired battery charger 9. In one embodiment, each of the positive and negative ring connectors 37, 38 include a metal screw 371 configured to pass through the respective rings so as to connect them. In the depicted embodiment, a metal washer 372 and metal nut 373 are configured to connect to a bottom end of the metal screw 371 and tighten the rings 26 and 14 together so as to maintain galvanic connection between them. The metal washer 372 may be, for example, a lock washer, which helps prevent vibration. In other embodiments, the ring connectors 37 and 38 may be other connection elements or means capable of connecting the respective rings, which are preferably devices that do not deform over time and or apply decreasing force on the rings to maintain the connection. For example, the ring connectors 37 and 38 may be metal clips or clamps, such as a spring loaded clamp.

Connection covers 40a and 40b cover each ring connecter in order to protect the connection from the elements. A negative connection cover is configured to encapsulate the connected negative ring end 26 and the negative ring terminal 14 of the pre-wired battery charger 9. The positive connection cover 40b is configured to encapsulate the connected positive ring end 27 with the positive ring terminal 16 of the pre-wired battery charger 9. Each of the negative and positive connection covers 40a, 40b may be a two-piece element where one of the cover pieces is placed on the connection end 32 of the cable extender 20 and the second cover piece is placed on the terminal end of the pre-wired battery charger. In the example, a first cover piece 41 is configured to fit over each of the positive and negative ring ends 26, 27. A second cover piece 52 is configured to fit over each of the negative and positive ring terminals 14, 16 of the pre-wired battery charger 9. Each first cover piece 41 is configured to releasably connect with the second cover piece 52 on the corresponding connection terminal without removing the ring terminal, as described herein.

Figure 3:
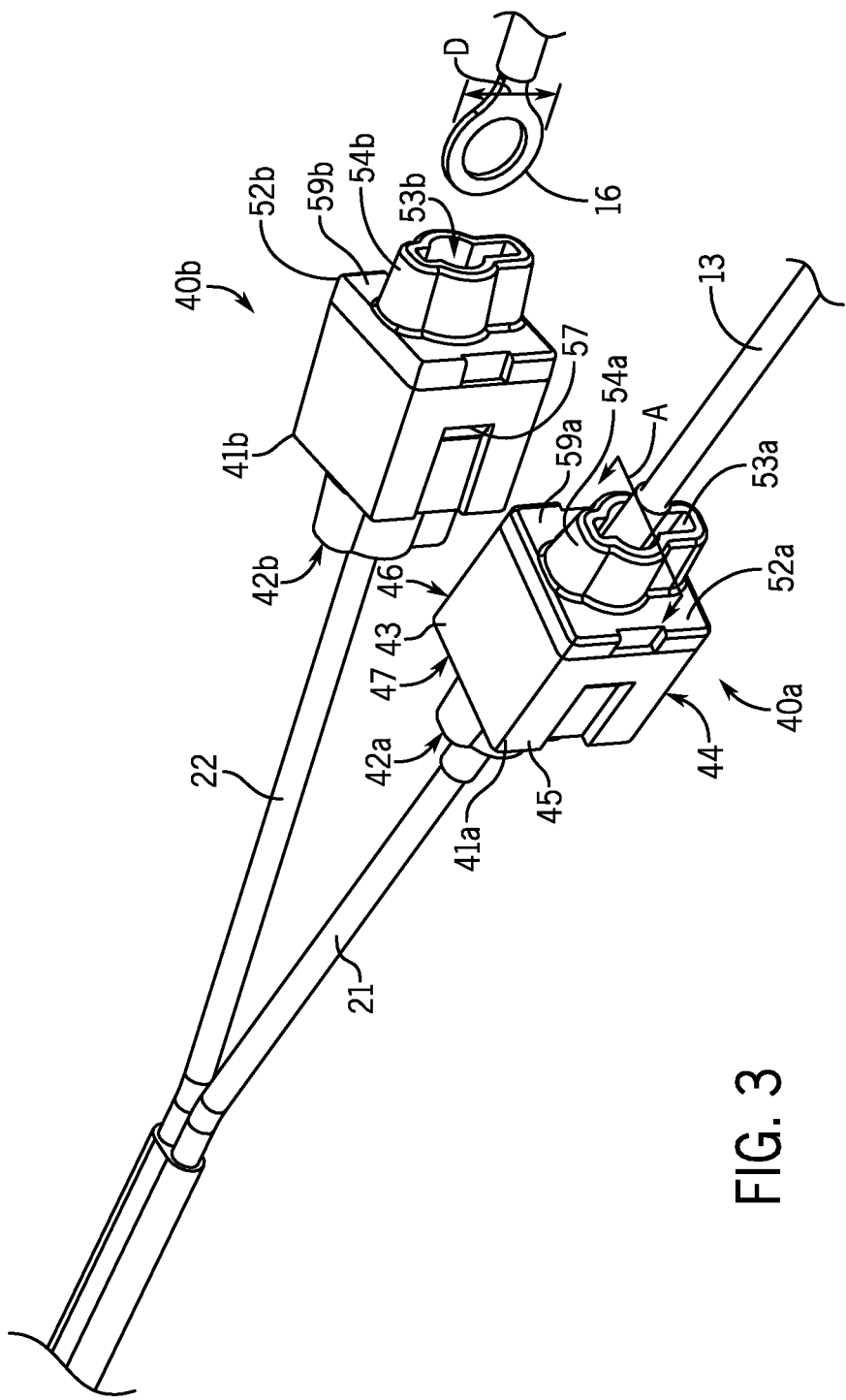
FIG. 3 further depicts connection of the cable extender to the terminal end of the pre-wired marine battery charger.
Figure 4:
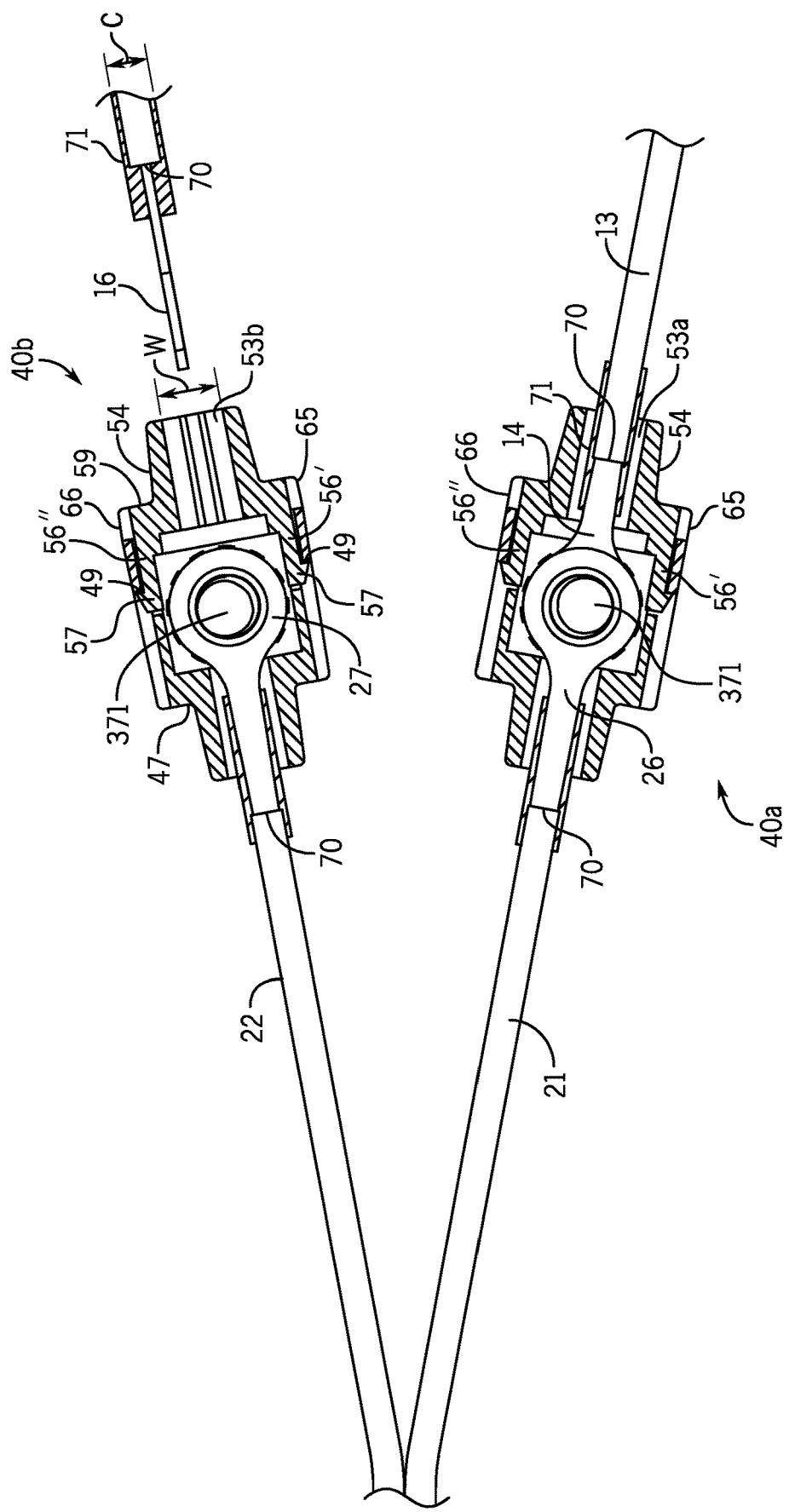
FIG. 4 depicts a cross-sectional view of the connection shown in FIG. 3.

FIG. 3 shows the first cover piece 41 and the second cover piece 52 connected together to form each of the negative connection cover 40a and the positive connection cover 40b. FIG. 4 depicts a cross-sectional view of each connection cover along cross-sectional indicator A of FIG. 3. The connection covers 40a and 40b are each generally cube-shaped and formed by connection of the two releasably connectable pieces. Thus, in the depicted example, the first cover piece 41 is configured to substantially cover the respective ring end 26, 27 and ring connector 37, 38, and the second cover piece 52 has a much narrower depth and is configured to connect at an open end 50 (FIG. 2) of the first cover piece in order to provide the second end portion 59 of the cube that encapsulates the connection. In the depicted cube-shaped example, each cover piece has a top portion 43 and a bottom portion 44 which form opposing sides of the cube shape, and also include a first side portion 45 and a second side portion 46 that form adjacent opposing sides. The first cover piece 41 that fits over the ring end 37 or 38 of the cable extender 20 has a first end portion 47. The second end portion 59 of the connection cover 40 is formed by the second cover piece that fits over the positive ring terminal. Thereby, the first cover piece 41 and the second cover piece 52 releasably connect together to form a cube shape that completely encapsulates the respective positive or negative connection between the ring terminal end (including over any heat shrink or insulating layer(s)) of the pre-wired battery charger 9 and the connection end 32 of the cable extender 20.

The first cover piece 41 and the second cover piece 52 of each connection cover 40 may be connected by a clasp 56 configure to releasably connect the two cover pieces together. FIGS. 2-4 depict an exemplary embodiment of the clasp 56, which in the depicted example is positioned on the second cover piece and is configured to releasably connect to a clasping edge 49 on the first cover piece 41. In one embodiment, each second cover piece 52 has two clasps 56, including a first clasp 56' on a first side portion 65 and a second clasp 56" on a second side portion 66. In one embodiment, the first cover portion 41 and the second cover portion 42 are made of a plastic material, such as a molded plastic material, and each clasp 56 is configured to be slightly deformable such that the clasp can slide into connection with the clasping edge 49 of the first cover piece 41. Thereby, the clasp system on the connection cover provides a low-cost, tool-less installation means.

The clasp 56 may have a clasp edge 57 that extends outward therefrom and maybe configured to slide in grooves 48 (FIG. 2) on an inner-side of each of the first side portion 45 and the second side portion 46 of the first cover piece 41. The deformable clasps 56 are configured to bend slightly inward as each clasp 56 slides in the grooves 48. An opening or indentation in the respective side portion 45, 46 accommodates the clasp edge 57, such that the clasp 56 returns to its normal condition forcing the clasp edge 57 into opposition with the clasping edge 49 of the first cover piece 41 so as to connect the cover pieces together. In order to release the connection, a user can depress each clasp edge 57 on either side of the connection cover 40 so as to deform the clasp 56 and allow the second cover piece 52 to be pulled away from the first cover piece 41.

In other embodiments, the clasp 56 may be any mechanism for connecting the connecting the cover pieces 41 and 52, and particularly for connecting two molded plastic pieces together. For example, the clasp may be on an exterior face of the first cover piece 41 or the second cover piece 52, and in such an embodiment, the clasping edge 49 would likewise be on an exterior face of the opposing cover piece 41, 52. In various embodiments, the clasping edge 49 may be inward-extending, and thus an indentation or groove in the respective side portion, or may be an outward-extending edge, such as a distended ledge molded on the plastic piece. A person having ordinary skill in the art will understand in view of the present disclosure that many embodiments of the clasp 56 and clasping edge 49 are within the scope of the present disclosure.

Figure 5:
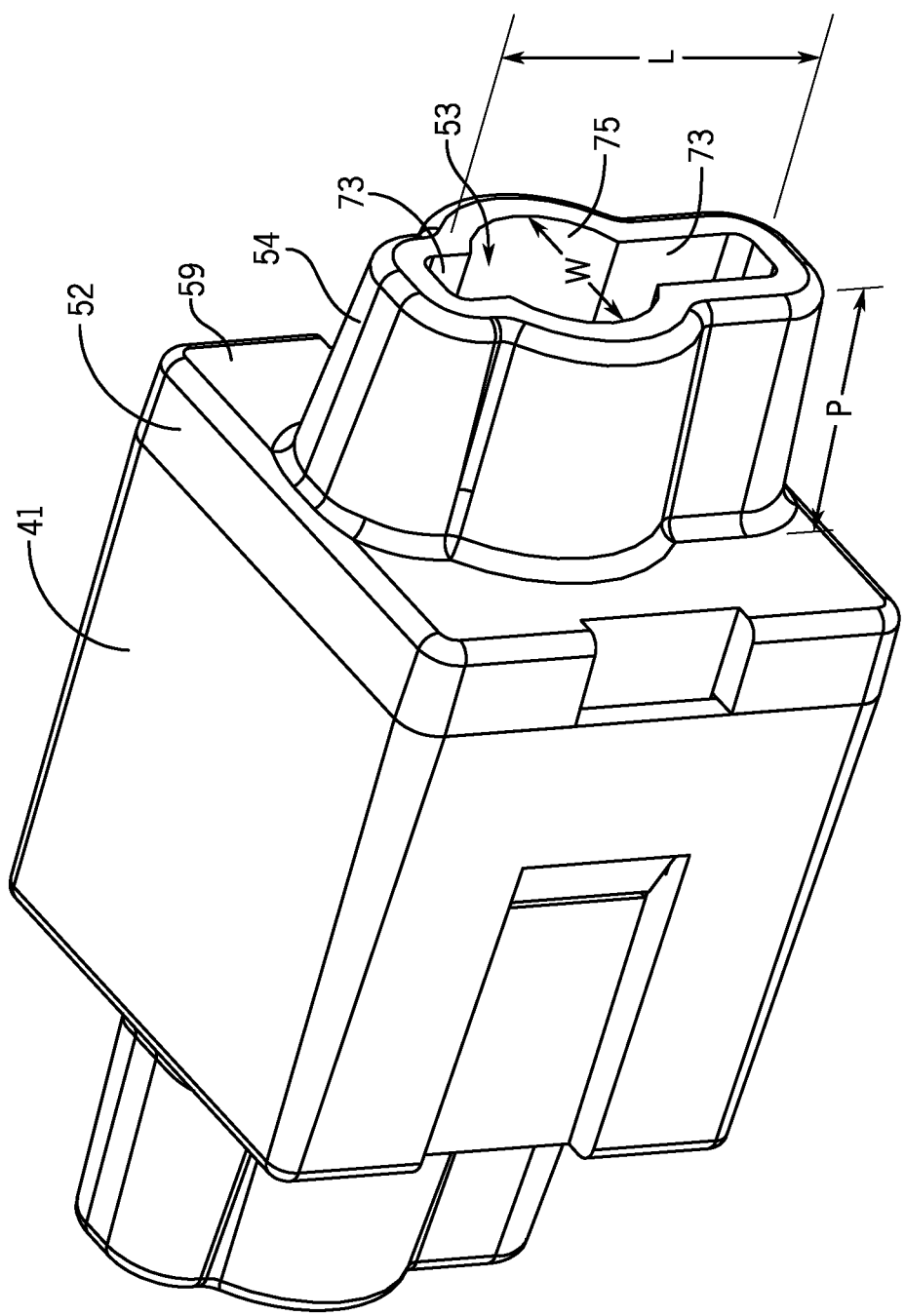
FIG. 5 depicts one embodiment of a connection cover for a ring terminal connection between a pre-wired charger and a cable extender according to one embodiment of the present disclosure.

In certain embodiments, each connection cover 40 has a collar 54 extending from each of the first end portion 47 and the second end portion 59. The collar 54 is best shown in FIG. 5. The collar may be configured to surround an opening 53 in each end portion 47, 59 of the connection cover 40 so as to reduce ingress of debris into the area inside of the connection cover 40 and protect the ring terminal from abrasion or short circuit. Each opening 53 is configured to allow one of the rings 14, 16, 26, 27 to slide through the end portion 47, 59 of the respective cover piece 41, 52. In other words, the opening 53 is configured to allow the cover piece 41/52 to slide over the ring. In certain embodiments, the opening 53 may be configured such that it only allows insertion of the ring at certain angles and thus is configured to prevent the ring from easily pulling back through the opening 53. Thus, the opening 53 may have an elongated portion having a length L configured to accommodate ring diameter D (FIG. 3). Thus, the respective ring 14, 16, 26, 27 is turned 90 degrees from the connection angle at which it is connected via the ring connector, such as shown in FIGS. 2 and 3, to be inserted through the end portion 47, 59 of the respective cover piece 41, 52. The ring can then be turned back 90 degrees in order to maintain that cover piece 41, 52 in the connection cover 40.

In certain embodiments, the opening 53 and collar 54 may further include a rounded portion 75 having an opening diameter W and configured to accommodate a joint 70 where the ring 14, 16, 26, 27 connects to the respective wire 13, 15, 21, 22. The rounded portion 75 bisects the elongated portion 74, and is configured in a position that aligns the respective cover piece 41, 52 appropriately for releasably connecting to the opposing cover piece 52, 41. As use herein, the term bisect is used to refer to the position of the rounded portion 75 somewhere between a top end and bottom end of the elongated portion 74. A joint cover 71 provides a plastic barrier over the joint 70 so as to keep it protected from short circuits. The joint cover 71 may have a diameter C (FIG. 4). The width W is greater than the diameter C of the joint cover 71 so as to enable the respective cover piece 41, 52 to slide over the joint 70. In certain embodiments, the collar 54 has a depth P sufficiently long to cover the joint to provide additional support and protection for the joint 70 area.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine battery charger cable extender configured to extend electrical connection between a pre-wired battery charger and a battery, the marine battery charger cable extender comprising:
   a terminal end including a positive extender ring terminal configured to connect to a positive battery terminal and a negative extender ring terminal configured to connect to a negative battery terminal;
   a connection end configured to connect to a terminal end of the pre-wired battery charger, the connection end including:
     a positive ring end;
     a positive ring connector configured to hold the positive ring end in electrical connection with a positive ring terminal of the pre-wired battery charger;
     a positive connection cover configured to completely encapsulate the connected positive ring end of the cable extender and the positive ring terminal of the pre-wired battery charger;
     a negative ring end;
     a negative ring connector configured to hold the negative ring end in electrical connection with a negative ring terminal of the pre-wired battery charger; and
     a negative connection cover configured to completely encapsulate the connected negative ring end of the cable extender and the negative ring terminal of the pre-wired battery charger.

2. The marine battery charger cable extender of claim 1, wherein each of the positive connection cover and the negative connection cover are formed by a first cover piece and a second cover piece that are releasably connected together.

3. The marine battery charger cable extender of claim 2, wherein each first cover piece and each second cover piece have an opening configured to allow the first cover piece and the second cover piece to slide over the respective ring.

4. The marine battery charger cable extender of claim 3, wherein each of the first cover piece and the second cover piece have a collar around the opening that extends outward to cover a joint where the respective ring end connects to a wire.

5. The marine battery charger cable extender of claim 4, wherein each ring has a ring diameter, and wherein the opening includes an elongated portion having a length configured to accommodate the ring diameter.

6. The marine battery charger cable extender of claim 5, wherein the opening further includes a rounded portion having an opening diameter configured to accommodate a joint where the respective ring connects to a wire, and wherein the rounded portion bisects the elongated portion.

7. The marine battery charger cable extender of claim 2, wherein the connected first cover piece and second cover piece form a cube-shape.

8. The marine battery charger cable extender of claim 2, wherein the first cover piece configured to slide over each ring end and the second cover piece is configured to slide over the ring terminal of the pre-wired battery charger, and wherein the first cover piece is configured to substantially cover the ring end and ring connector.

9. The marine battery charger cable extender of claim 2, further comprising at least one clasp on each second cover piece, wherein the clasp is configured to releasably connect to a clasping edge on the respective first cover piece.

10. The marine battery charger cable extender of claim 2, further comprising a clasp on one of the first cover piece and the second cover piece for each of the positive connection cover and the negative connection cover, wherein the clasp is configured to releasably connect the first cover piece and the second cover piece together.

11. The marine battery charger cable extender of claim 1, wherein the positive ring connector includes a metal screw configured to pass through the positive ring end of the cable extender and the positive ring terminal of the pre-wired battery charger, and wherein the negative ring connector includes a metal screw configured to pass through the negative ring end of the cable extender and the negative ring terminal of the pre-wired battery charger.

12. The marine battery charger cable extender of claim 11, wherein each of the positive ring connector and the negative ring connector comprise a metal nut configured to mate with the respective screw so as to tightly compress each ring end of the cable extender to the respective ring terminal of the pre-wired battery charger.

13. A marine battery charger cable extender configured to extend electrical connection between a pre-wired battery charger and a battery, the marine battery charger cable extender comprising:
 a terminal end including a positive extender ring terminal configured to connect to a positive battery terminal and a negative extender ring terminal configured to connect to a negative battery terminal;
 a connection end configured to connect to a terminal end of the pre-wired battery charger, the connection end including:
  a positive ring end;
  a positive ring connector including a first metal screw configured to hold the positive ring end in electrical connection with a positive ring terminal of the pre-wired battery charger;
  a positive connection cover configured to completely encapsulate the connected positive ring end of the cable extender and the positive ring terminal of the pre-wired battery charger;
  a negative ring end;
  a negative ring connector including a second metal screw configured to hold the negative ring end in electrical connection with a negative ring terminal of the pre-wired battery charger;
  a negative connection cover configured to completely encapsulate the connected negative ring end of the cable extender and the negative ring terminal of the pre-wired battery charger; and
  wherein each of the positive connection cover and the negative connection cover are formed by a first cover piece and a second cover piece that are releasably connected together.

14. The marine battery charger cable extender of claim 13, wherein each of the positive ring connector and the negative ring connector comprise a metal nut configured to mate with the respective metal screw so as to tightly compress each ring end of the cable extender to the respective ring terminal of the pre-wired battery charger.

15. The marine battery charger cable extender of claim 13, wherein each first cover piece and each second cover piece have an opening configured to allow the first cover piece and the second cover piece to slide over the respective ring.

16. The marine battery charger cable extender of claim 15, wherein each of the first cover piece and the second cover piece have a collar around the opening that extends outward to cover a joint where the respective ring connects to a wire.

17. The marine battery charger cable extender of claim 15, wherein each ring has a ring diameter, and wherein the opening includes an elongated portion having a length configured to accommodate the ring diameter.

18. The marine battery charger cable extender of claim 17, wherein each opening further includes a rounded portion having an opening diameter configured to accommodate a joint where the respective ring connects to a wire, and wherein the rounded portion bisects the elongated portion.

19. The marine battery charger cable extender of claim 13, wherein the first cover piece is configured to substantially cover the positive ring end and positive ring connector and the second cover piece is configured to removably connect to an open end of the first cover piece.

20. The marine battery charger cable extender of claim 13, further comprising at least one clasp on each of the second cover pieces, wherein the clasp is configured to releasably connect to a clasping edge on the respective first cover piece.

* * * * *

UNITED STATES PATENT AND TRADEMARK OFFICE
CERTIFICATE OF CORRECTION

PATENT NO. : 11,757,295 B2
APPLICATION NO. : 16/913095
DATED : September 12, 2023
INVENTOR(S) : Shaffer et al.

It is certified that error appears in the above-identified patent and that said Letters Patent is hereby corrected as shown below:

On the Title Page

Item (54) Title: "MARINE BATTERY CHARGER CABLE EXPENDER" should instead read
-- MARINE BATTERY CHARGER CABLE EXTENDER" --

In the Specification

Column 1, Line 1: "MARINE BATTERY CHARGER CABLE EXPENDER" should instead read
-- MARINE BATTERY CHARGER CABLE EXTENDER" --

Signed and Sealed this
Thirty-first Day of October, 2023

Katherine Kelly Vidal
*Director of the United States Patent and Trademark Office*